(12) United States Patent
Yamashita

(10) Patent No.: US 10,174,925 B2
(45) Date of Patent: Jan. 8, 2019

(54) WAVELENGTH CONVERSION MEMBER AND LIGHT SOURCE DEVICE HAVING WAVELENGTH CONVERSION MEMBER

(71) Applicant: NICHIA CORPORATION, Anan-shi, Tokushima (JP)

(72) Inventor: Toshiaki Yamashita, Komatsushima (JP)

(73) Assignee: NICHIA CORPORATION, Anan-shi (JP)

( * ) Notice: Subject to any disclaimer, the term of this patent is extended or adjusted under 35 U.S.C. 154(b) by 44 days.

(21) Appl. No.: 15/384,519

(22) Filed: Dec. 20, 2016

(65) Prior Publication Data
US 2017/0184254 A1    Jun. 29, 2017

(30) Foreign Application Priority Data

Dec. 25, 2015 (JP) .................................. 2015-253950
Jan. 21, 2016 (JP) .................................. 2016-009747

(51) Int. Cl.
| | |
|---|---|
| F21V 13/08 | (2006.01) |
| F21V 9/30 | (2018.01) |
| F21V 29/502 | (2015.01) |
| G03B 21/20 | (2006.01) |
| H04N 9/31 | (2006.01) |
| F21S 41/14 | (2018.01) |

(Continued)

(52) U.S. Cl.
CPC ............ *F21V 29/502* (2015.01); *F21S 41/14* (2018.01); *F21S 41/16* (2018.01); *F21V 9/30* (2018.02); *G03B 21/204* (2013.01); *H04N 9/31* (2013.01); *F21Y 2115/30* (2016.08); *G02F 2001/133614* (2013.01)

(58) Field of Classification Search
CPC .......... F21V 13/08; F21V 29/502; F21V 9/30; F21V 9/32; F21K 9/64
See application file for complete search history.

(56) References Cited

U.S. PATENT DOCUMENTS

| | | |
|---|---|---|
| 2012/0201030 A1 | 8/2012 | Yuan et al. |
| 2013/0027962 A1* | 1/2013 | Takahashi ................. F21V 9/30 |
| | | 362/538 |

(Continued)

FOREIGN PATENT DOCUMENTS

| | | |
|---|---|---|
| JP | 2012-243624 A | 12/2012 |
| JP | 2013-102078 A | 5/2013 |

(Continued)

*Primary Examiner* — Alan B Cariaso
(74) *Attorney, Agent, or Firm* — Global IP Counselors, LLP (57) ABSTRACT

A wavelength conversion member includes a light-reflecting member configured to reflect laser light, and a phosphor-containing layer disposed on the light-reflecting member. The phosphor-containing layer includes one or more projecting portions each configured to be irradiated with laser light. An area of each projecting portion is larger than an area of a spot of the laser light in a plan view. A light source device includes the wavelength-converting member and one or more laser elements. The wavelength-converting member is arranged at a position so that laser light emitted from the one or more laser elements are irradiated on a corresponding one of the one or more projecting portions.

16 Claims, 5 Drawing Sheets

(51) Int. Cl.
*F21S 41/16*    (2018.01)
*F21Y 115/30*   (2016.01)
*G02F 1/1335*   (2006.01)

(56) References Cited

U.S. PATENT DOCUMENTS

| | | |
|---|---|---|
| 2013/0056775 A1 | 3/2013 | Kawakami |
| 2013/0249388 A1 | 9/2013 | Ryowa et al. |
| 2013/0322055 A1 | 12/2013 | Sugiyama |
| 2014/0154453 A1 | 6/2014 | Cao et al. |
| 2015/0176792 A1* | 6/2015 | Hager .................. F21S 41/125 362/510 |
| 2015/0316233 A1 | 11/2015 | Kawamata et al. |
| 2016/0195244 A1 | 7/2016 | Harada |

FOREIGN PATENT DOCUMENTS

| | | |
|---|---|---|
| JP | 2013-197530 A | 9/2013 |
| JP | 2013-250321 A | 12/2013 |
| JP | 2014-507013 A | 3/2014 |
| JP | 2014-529096 A | 10/2014 |
| JP | 2015-103539 A | 6/2015 |
| JP | 2016-127199 A | 7/2016 |
| WO | 2012-109168 A1 | 8/2012 |
| WO | 2013-024246 A1 | 2/2013 |

\* cited by examiner

WAVELENGTH CONVERSION MEMBER AND LIGHT SOURCE DEVICE HAVING WAVELENGTH CONVERSION MEMBER

CROSS-REFERENCE TO RELATED APPLICATIONS

This application claims priority to Japanese Patent Application No. 2015-253950 filed on Dec. 25, 2015 and Japanese Patent Application No. 2016-9747 filed on Jan. 21, 2016. The entire disclosures of Japanese Patent Application Nos. 2015-253950 and 2016-9747 are incorporated herein by reference.

BACKGROUND

1. Technical Field

The present disclosure relates to a wavelength conversion member and to a light source device.

2. Description of Related Art

Light source devices based on a combination of a semiconductor laser element and a phosphor-containing member may be configured such that laser light is irradiated on the phosphor-containing member provided on a substrate so as to obtain white reflected light, as described in JP2012-243624A, for example.

SUMMARY

In order to improve strength of the phosphor-containing member in such a light source device, the thickness of the phosphor-containing layer may be increased. Also, the phosphor generates heat when irradiated with the laser light. In order to dissipate the heat, the area of the phosphor-containing member at the substrate side may be increased. On the other hand, when a phosphor-containing member having a greater thickness and greater area is used to improve the strength and heat dissipation, the laser light tends to spread within the phosphor-containing member, which may result in a decrease in the luminance.

One object of certain embodiments of the present invention is to provide a wavelength conversion member that allows an improvement in strength and heat dissipation while increasing luminance, and to provide a light source device that employs the wavelength conversion member.

A wavelength conversion member of certain embodiments of the present invention includes a light-reflecting member configured to reflect laser light, and a phosphor-containing layer disposed on the light-reflecting member. The phosphor-containing layer has one or more projecting portions. Each of the projection portions is configured to be irradiated with laser light, and is formed larger than a spot of the laser light that irradiates the projection portion.

A light source device of certain embodiments of the present invention includes the wavelength conversion member described above, and one or more laser elements. The wavelength conversion member is arranged so that laser light emitted from the one or more laser elements is irradiated on a corresponding one of the one or more projecting portions According to the present disclosure, a wavelength conversion member having improved strength and heat dissipation and allowing an improvement in the luminance, and a light source device employing the wavelength conversion member can be provided.

DETAILED DESCRIPTION

The embodiments for implementing a wavelength conversion member and a light source device according to the present invention will be described below with reference to the drawings.

Wavelength Conversion Member

Figure 1A:
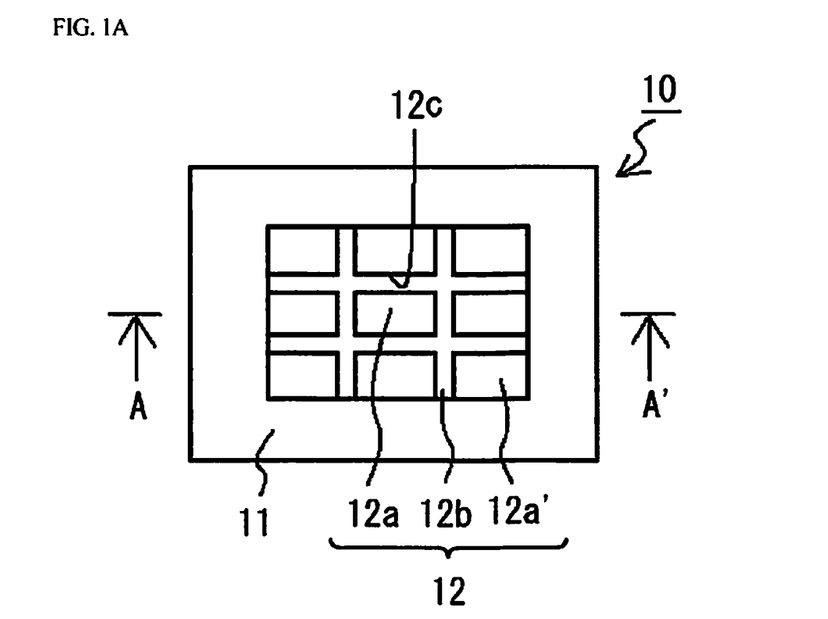
FIG. 1A is a plan view of a wavelength conversion member according to a first embodiment of the present invention.
Figure 1B:
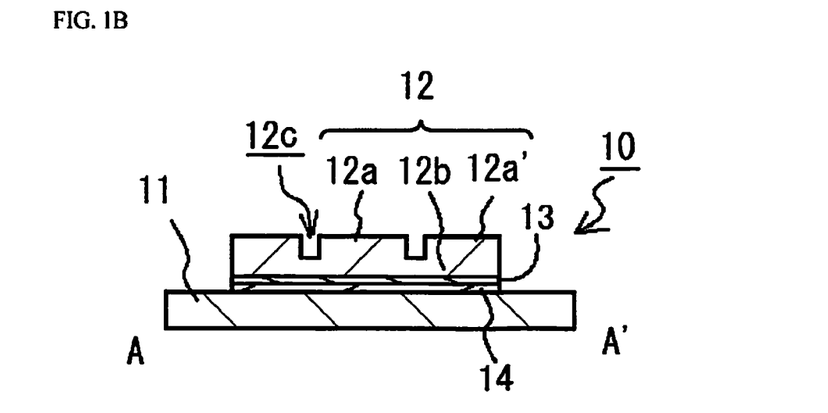
FIG. 1B is a cross sectional view taken along line A-A' of FIG. 1A.

As shown in FIG. 1A and FIG. 1B, a wavelength conversion member according to certain embodiments includes a light-reflecting member configured to reflect laser light, and a phosphor-containing layer provided on this light-reflecting member. The light-reflecting member is provided on a substrate.

The phosphor-containing layer has one or more projecting portions configured to be irradiated with laser light. More specifically, the phosphor-containing layer includes a base component at the substrate side and a projecting portion that is continuous with the base component, starting from the substrate side. The projecting portion is larger than the spot of laser light that irradiates the projecting portion.

This arrangement allows for fixing a base component that is larger than the projecting portion to the substrate or the like, so that the strength can be improved. Further, the base component can serve as a heat dissipation path to the substrate, etc., so that heat dissipation can also be improved. In addition, diffusion of the laser light irradiated on the projection portion into the phosphor-containing layer can be reduced by the projecting portion, so that luminance of the light emitting device in which laser light is irradiated on the wavelength conversion member can be increased.

Substrate

The substrate is a member to which the phosphor-containing layer is fixed via the light-reflecting member. Various materials that are electrically conductive, insulating, etc., can be used for the substrate. Examples of the material of the substrate include metals, ceramics, glass, and combinations of these. Examples of metals include silver, copper, aluminum, gold, rhodium, and alloys containing one or more of these, and ceramics include alumina and the like. The substrate may be a single layer of one of these materials, or may have a layered structure.

The substrate is preferably made of a material having a thermal conductivity greater than a thermal conductivity of the phosphor-containing layer to be described below. This allows heat from the phosphor-containing layer to be dissipated more efficiently. Examples of such a material include aluminum, aluminum alloys, copper, and copper alloys. Typically, the phosphor-containing layer is fixed to the substrate via the light-reflecting member and a joining layer so as to ensure a heat dissipation path from the phosphor-containing layer to the substrate. The various members need not be in direct contact, and an adhesive layer, barrier layer, or the like can be provided between the members. Also, when viewed from above, the area of the substrate is preferably greater than the area of the phosphor-containing layer. This allows substantially the entire surface of the phosphor-containing layer to be fixed to the substrate via the light-reflecting member, etc., which allows more secure fixing and efficient heat dissipation. In the present specification, the terms "when viewed from above", "in a top view", and "in a plan view" each refers to viewing in a direction that is substantially perpendicular to the main surface of the substrate.

The substrate may have a thickness sufficient to ensure the desired strength, for example, the thickness may be about 500 µm or greater. Also, the thickness of the substrate may be, for example, 5 mm or less. The substrate may be usually thicker than the phosphor-containing layer.

Light-Reflecting Member

The light-reflecting member preferably can reflect laser light that is irradiated to the region opposite the phosphor-containing layer. For instance, a film of the light-reflecting member is formed on one main surface side (the lower surface side) of the phosphor-containing layer. The substrate may be arranged on the opposite side of the light-reflecting member from the phosphor-containing layer. The light-reflecting member may at least be arranged directly under the projecting portion of the phosphor-containing layer, and is preferably provided to substantially the entire lower surface of the phosphor-containing layer. Also, the light-reflecting member preferably has a reflectance of preferably 60% or greater, more preferably 90% or greater of the laser light irradiated on the light-reflecting member. The light-reflecting member also preferably reflects at least 60% of the light whose wavelength is converted by the phosphor, and more preferably at least 90%. The light-reflecting member preferably includes a metal layer in order to obtain a relatively high reflectivity over a broad wavelength band. For instance, the light-reflecting member includes a silver layer or an aluminum layer. The light-reflecting member preferably has a thickness that allows obtaining of the reflectance described above, and for example, the thickness may be 100 nm or greater. The thickness of the light-reflecting member can be 3 µm or less, for example. When the metal layer is disposed directly on the phosphor-containing layer, a portion of the light may be absorbed by the metal layer. For this reason, a light-transmissive film made of a dielectric material is preferably provided between the metal layer and the phosphor-containing layer. In this case, light from the phosphor-containing layer can be reflected at the interface between the phosphor-containing layer and the light emissive film due to a difference in the refractive indices therebetween, and light that is not reflected at the interface can be reflected by the metal film. With this arrangement, because the light-transmissive film made of a dielectric material hardly absorb light, the overall reflectivity can be increased. The light emissive film may be a single-layer dielectric film, or it may be a multilayer dielectric film. In addition to $SiO_2$, the material of the light emissive film can be any material with better thermal conductivity than the phosphor, such as $Al_2O_3$ or MgO. In the case that the light emissive film is a multilayer dielectric film, the multilayer film can be produced by repeatedly layering an $SiO_2$ film and an $Nb_2O_5$ film, for example.

Phosphor-Containing Layer

The phosphor-containing layer is used to convert the wavelength of the laser light emitted from the laser element. To this end, it contains a phosphor capable of converting the wavelength of the laser light emitted from the laser element. Examples of the phosphor include YAG-based phosphors, LAG-based phosphors, and TAG-based phosphors. Two or more types of phosphor can also be included in a single phosphor-containing layer 12. In particular, a YAG-based phosphor is preferable when using a laser element in which the active layer is composed of a GaN-based material. This is because it has high durability against laser light, and white light can be obtained by combining with a blue laser.

The phosphor-containing layer may be formed by a phosphor alone, but is preferably formed from a phosphor and a support that is used to hold the phosphor. In the former case phosphor distribution unevenness can be reduced. In the latter case, the support is preferably an inorganic material. This suppresses degradation, discoloration, and so forth of the support that are attributable to the light emitted from the laser element. Examples of inorganic materials include $Al_2O_3$ and $Y_2O_3$.

The phosphor-containing layer has a base component and a projecting portion that is continuous to the base component, starting from the substrate side. The projecting portion may protrude above the base component, that is, in a direction moving away from the light-reflecting member. The projecting portion is larger than the spot of laser light that irradiates the projecting portion. That is, the outer edge of the projecting portion is larger than the spot of laser light in a plan view as seen from the top side. Consequently, even though the laser light diffuses and spreads out within the phosphor-containing layer, the spreading can be limited at the projecting portion, so that luminance can be increased. Further, the spreading of light produced by the excitation of the phosphor by the laser light can also be limited at the projecting portion, so this also affords higher luminance. In particular, since the light produced by the phosphor has almost no directionality, it tends to spread out in all directions (up, down, left, and right) in the interior of the phosphor-containing layer, so this spreading is preferably limited by the projecting portion. This limitation of the spreading of light by the projecting portion can be accomplished, for example, by reflecting part of the light by means of the refractive index differential between the projecting portion and the outside thereof (such as the atmosphere). By limiting the spreading of light as described above, when the laser light is irradiated and viewed from the above, most intense emission from the phosphor-containing layer can be obtained at the projecting portion.

The area in top view is preferably large enough to encompass the entire spot of emitted laser light, and small enough for the desired luminance to be obtained. For example, the area of the projecting portion in top view is preferably no more than twice the spot area of the laser light. Specifically, the area of the projecting portion is preferably about 100% to 200% of the area of the spot of laser light, and more preferably about 110% to 150%. Incidentally, luminance is measured in units of cd/m$^2$, and luminance is the luminance per unit area. Therefore, the larger is the area of the projecting portion and the larger is the emission surface, the lower is the luminance. To avoid this, the area of the projecting portion is preferably no more than 1 mm$^2$, and more preferably no more than 0.5 mm$^2$ in a plan view. Keeping the size of the projecting portion within this range makes it possible to take advantage of the benefits of a laser diode, which has higher luminance than an LED. Also, the area of the projecting portion is, for example, at least 0.01 mm$^2$, and may be at least 0.25 mm$^2$ in a plan view. The "spot of the laser light" refers to the shape when the laser light reaches the surface of the projecting portion.

The far field pattern (FFP) of the laser light is approximately elliptical in shape, but as will be discussed below, for example, in the case that the laser light is emitted in a direction that intersects the main surface of the substrate, the spot of laser light will be in the form of a distorted ellipse.

Examples of the plan view shape of the projecting portion include a substantially polygonal shape, a substantially circular shape, and a substantially elliptical shape. In view of ease of manufacturing, a substantially polygonal shape such as a triangular shape or a quadrangular shape can be advantageous. Meanwhile, when the planar shape of the projecting portion is approximate to the spot of the laser light, the size of the projecting portion can be brought closer to the size of the laser light spot, so that the luminance can be further increased. Examples of such a shape include a substantially circular shape and a substantially elliptical shape.

The projecting portion has a top surface that is the laser light irradiating side. The top surface may be a curved surface (a dome shape or cup shape), etc., but preferably is a substantially flat surface. In this case, the projecting portion also has side surfaces extending from the top surface toward the light-reflecting member. A projecting portion such as this can be formed more easily than a projecting portion consisting of a curved surface.

A "substantially flat surface" may be a rough surface, as long as it is flat in macro view. A rough surface allows the laser light to be scattered as it is reflected, so it is believed that wavelength-converted light and laser light can be mixed more efficiently. A light source device that affords such mixed light is advantageous as a light source in applications that require color rendering properties sufficient to be used for automotive headlights, etc.

In another embodiment, a function of suppressing the reflection of laser light may be added to the surface of the phosphor-containing layer, and particularly the top surface of the projecting portion. For example, an anti-reflection film may be provided to the top surface of the projecting portion. Also, a film having the function of mainly transmitting at the angle at which the laser light is incident on the phosphor-containing layer, and mainly reflecting at other angles, in the wavelength region of the laser light may be provided to the top surface of the projecting portion. This film will function as a light-transmissive film for light whose wavelength has been converted by the phosphor. Consequently, substantially just wavelength-converted light can be extracted from the phosphor-containing layer, which is advantageous in use as a light source for a projector, for example.

Also, in the case that the top surface of the projecting portion is substantially polyhedral, the area of the top surface is preferably greater than the area of the various side surfaces of the projecting portion (the surfaces extending from the top surface toward the light-reflecting member). This allows the top surface of the projecting portion to serve as the main emission surface of the wavelength conversion member. The top surface of the projecting portion is substantially parallel to the main surface of the light-reflecting member, for example.

A single projecting portion may be arranged on the base component. In this case, the projecting portion is preferably arranged at approximately the center of the base component. With this, heat generated in the projecting portion can be dissipated from the approximate center of the base component, so heat can be dissipated efficiently.

Also, the projecting portion may be demarcated by grooves (for example, 12c in FIG. 1A and FIG. 1B). That is, the surface of the phosphor-containing layer may be demarcated by grooves. In this case, the bottom surfaces of the grooves correspond to the surface of the base component. Also, a plurality of projecting portions may be arranged adjacent to each other with the grooves in between. In the case of arranging a plurality of projecting portion, at least one projecting portion 12a is formed with the size discussed above. Such a projecting portion 12a as described above is irradiated with laser light. The other projecting portions 12a' that are not subjected to laser irradiation may have the same shape, size, and so forth as the one or more projecting portions 12a having the above-mentioned size, or these may be different. A configuration that includes these projecting portions 12a' can be produced by forming the grooves with a dicing machine or the like, so manufacture is easy.

The grooves may respectively have a depth of at least 30% of the thickness of the phosphor-containing layer, for example, and preferably at least 50%, and more preferably about 50 to 80%. With this range, occurrence of separation of the phosphor-containing layer will tend not to separate, and an integrated structure can be maintained. The depth of the grooves is about 60 μm or less, for example. The grooves are formed in the phosphor-containing layer with a depth such that the bottoms of the grooves are preferably 20 μm or greater, may be 40 μm or greater, apart from an upper plane of the light-reflecting member. With this arrangement, occurrence of separation of the phosphor-containing layer at the grooves can be reduced. The depth of the grooves may also be called the height of the projecting portions. A reflective film may be provided in the grooves. For instance, after the grooves are formed, a reflective film is formed on substantially the entire exposed surface of the phosphor-containing layer. Subsequently, polishing or the like is performed from the upper surface side of the projecting portion to remove the reflective film. Thus, a structure in which a reflective film is formed in the grooves can be obtained. Having the bottoms of the grooves not reach the surface of the phosphor-containing layer on the light-reflecting member side results in more joining area with the substrate than when the bottoms do reach. With this arrangement, the possibility of scattering or breaking of the projecting portion due to a stress loaded on the phosphor-containing layer at the time of polishing or the like can be reduced. Examples of the reflective film include a dielectric material multilayer film, and a single- or multi-layer metal film. Niobium oxide or the like can be used as the dielectric material, and aluminum or the like can be used as the metal. The reflective film may be formed by way of atomic layer deposition (ALD). Also, an optical absorption material that absorbs light may be disposed in the grooves, or an optical reflection material and an optical absorption material may both be disposed.

The width of each of the grooves is preferably greater than the wavelength of the laser light irradiated on the phosphor-containing layer. This makes it easier for the grooves to disrupt spreading of the light in the event that the laser light diffuses and spreads out within the phosphor-containing layer. Thus, a decrease in luminance can be reduces when the wavelength conversion member emits light. Furthermore, the width of the grooves is preferably greater than the emission by the phosphor contained in the phosphor-containing layer, that is, the wavelength of the light emitted when the phosphor is excited by the laser light. This makes it easier for the grooves to disrupt spreading of the light whose wavelength has been converted by the phosphor, and makes a decrease in luminance even less likely. Thus setting the width of the grooves to be at least the wavelength of the light confined within the projecting portions allows light to be reflected at the boundary of the projecting portions and whatever fills the grooves (typically, air) by means of the refractive index differential between the two. Also, the width of the grooves may be, for example, 3 mm or less. When a blade or the like is used to form the grooves, the width can be, for example, 0.1 mm or greater, for the sake of easy machining. The width of the grooves may be 0.4 mm or greater. The "width of the grooves" refers to the distance in a direction substantially parallel to the main surface of the light-reflecting member (the surface on the phosphor-containing layer side), out of the distance from one side surface to the other side surface of a groove in a direction that is substantially perpendicular to the direction in which the groove extends. For example, the width at the uppermost part of a groove can be within the above-mentioned range. More preferably, the grooves are formed so that when a groove is cut substantially perpendicular to the direction in which the groove extends, the width of the groove falls within the above-mentioned range in at least half of the region in the depth direction of the groove.

The grooves preferably all have the same depth and/or width, but as long as the grooves demarcating the above-mentioned projecting portion 12a have the above-mentioned width and depth, then the grooves demarcating the projecting portions 12a' other than the above-mentioned projecting portion 12a need not have the above-mentioned width and/or depth.

Figure 5:
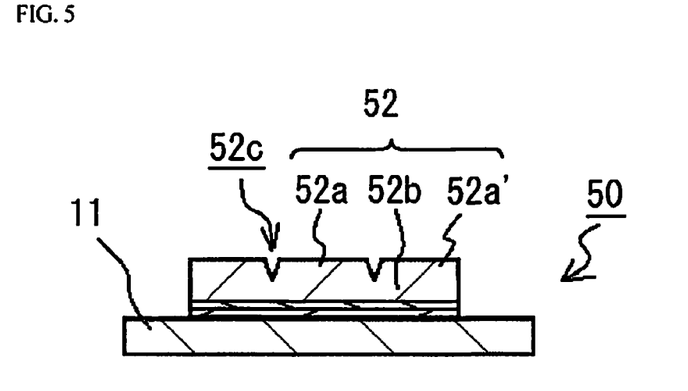
FIG. 5 is a cross sectional view of a wavelength conversion member according to fifth embodiment.

The cross sectional shape of the grooves may be quadrangular, for example (12c in FIG. 1A, for example), or may be semi-elliptical or semicircular (72c in FIG. 7, for example), or may be a tapered shape that is narrower on the bottom surface side (62c in FIG. 6, for example), or may be V shaped (52c in FIG. 5, for example). Regardless of the cross sectional shape, the maximum width and the maximum depth of the grooves may correspond to the above-mentioned width and depth.

Figure 2A:
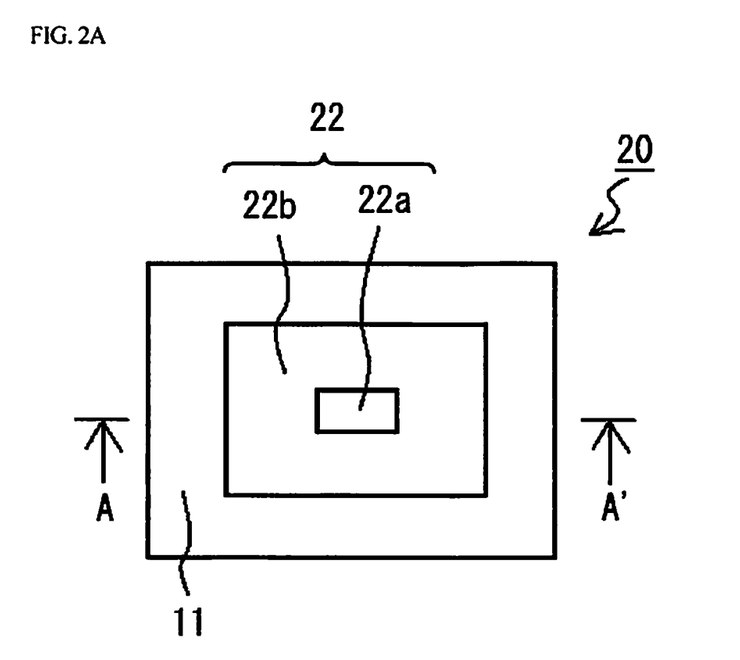
FIG. 2A is a plan view of a wavelength conversion member according to a second embodiment of the present invention.
Figure 2B:
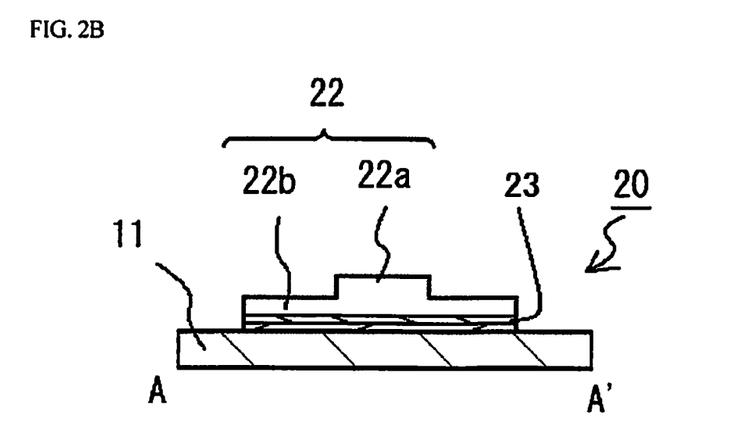
FIG. 2B is a cross sectional view taken along line A-A' of FIG. 2A.

As shown in FIGS. 2A and 2B, in the case that there is just one projecting portion 22a, the region of the base component 22b that is exposed from the projecting portion 22a can have the same shape as the above-mentioned grooves, etc.

The thinner is the phosphor-containing layer, the more prone it is to cracking, and the more difficult it is to handle. On the other hand, an excessive thickness increases the distance between the top portion of the projecting portion that is a main heat-generating region and the substrate, resulting in a decrease of heat dissipation. Therefore, the thickness of the phosphor-containing layer, as a total thickness of the projecting portion and the base component, is preferably 50 µm to 300 µm, and more preferably 80 µm to 200 µm.

The phosphor-containing layer can be formed, for example, using spark plasma sintering (SPS), hot isostatic pressing (HIP), cold isostatic pressing (CIP), or the like.

The grooves can be formed by dicing or by using a machining center, for example. The grooves may be formed by patterning using a photolithography and etching step, or using a liftoff method. It is particularly favorable to form the grooves with a dicing machine that makes use of a blade or a laser. This allows the grooves to be formed with ease. For example, the blade or laser may be scanned longitudinally and laterally with respect to the phosphor-containing layer. In this case, when viewed from the above, the grooves may reach the end of the phosphor-containing layer. The grooves may be formed after the phosphor-containing layer is fixed to the substrate. With this separation of the phosphor-containing layer caused by the grooves is assumed to be further reduced.

Light Emitting Device

Figure 8:
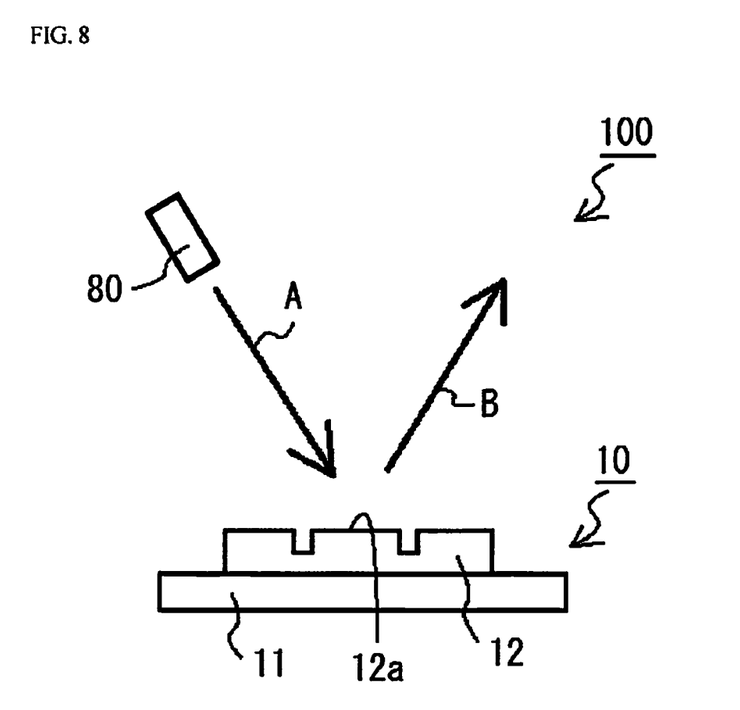
FIG. 8 is a schematic diagram illustrating a configuration of a light source device according to an eighth embodiment of the present invention.

As shown in FIG. 8, a light emitting device 100 according to certain embodiments has at least one laser element 80 for irradiating the above-mentioned phosphor-containing layer 12 with laser light. A wavelength conversion member 10 is arranged at a position where the projecting portion 12a of the wavelength conversion member 10 is irradiated with laser light A emitted from the laser element 80.

With this configuration, the proper area of the phosphor-containing layer is ensured at the base component, so the strength and heat dissipation of the phosphor-containing layer can be improved, and the spreading of laser light within the phosphor-containing layer can be suppressed by the projecting portion. As a result, the emission surface can be limited mainly to the projecting portion, so the luminance of the light source device can be increased.

With this light emitting device, a wavelength conversion member having one projecting portion for one laser element may be used, or a wavelength conversion member having a plurality of projecting portions may be used. Also, a wavelength conversion member having one projecting portion for a plurality of laser elements may be used, or a wavelength conversion member having a plurality of projecting portions may be used. When a plurality of laser elements are used, the laser beams emitted from the laser elements converge into a single beam.

Laser Element

The laser element is used as the light source of the light source device. Since the laser light emitted by the LD is highly directional, it is generally higher luminance than the light emitted by a light emitting diode (LED). Therefore, using a laser element as the light source gives a light source device that is brighter than when an LED is used.

The laser light A emitted from the laser element goes through the air or an optical member, etc., toward the wavelength conversion member. Some of the laser light A that irradiates the projecting portion of the phosphor-containing layer is taken into the phosphor-containing layer. This part of the laser light A will sometimes be reflected by the surface, depending on the surface state of the phosphor-containing layer. For example, the surface of the phosphor-containing layer can be adjusted so that there will be more light incident inside the phosphor-containing layer than there is reflected light. Some of the light taken into the phosphor-containing layer is excited and has its wavelength converted. The rest of it is reflected by the light-reflecting member, its wavelength is not converted, and it is extracted to the outside still having the same wavelength as the laser light A. The light B extracted to the outside may be just light whose wavelength has been converted, or may be a mixture of the laser light A and wavelength-converted light. Since the laser light A is scattered, etc., by the phosphor-containing layer, after going through the phosphor-containing layer it may no longer be laser light. However, light with the wavelength of the laser light A tends to be light having the highest strength in the direction of the light B, that is, in the direction in which the laser light A is reflected when the surface of the projecting portion is used as the reflecting surface, even after going through the phosphor-containing layer. Since the light emitted by the phosphor has almost no directionality, the direction in which the wavelength-converted light is heading is not limited to the direction of the light B in FIG. 8. The light distribution of the wavelength-converted light is believed to be dependent on the shape of the phosphor-containing layer and the incidence angle of the laser light A. For example, in the case that the projecting portion is a shape having a substantially flat top surface as in FIG. 8, the light is believed to be extracted mainly in the direction facing up from the top surface. Furthermore, the laser element is provided at a position away from the phosphor-containing layer. Consequently, the heat dissipation path from the laser element can be separate from the heat dissipation path from the phosphor-containing layer, so heat can be removed from the various members efficiently.

In particular, of the laser light, the light taken into the wavelength conversion member will be taken into the projecting portion of the wavelength conversion member, but because the projecting portion is surrounded by air, for example, the spreading out of light at its end surface is suppressed. This reduces the spreading of laser light taken into the projecting portion, and also reduces the spreading of light emitted by the phosphor excited by the laser light, so light can be efficiently guided in a specific direction and extracted. As a result, the emission surface when the wavelength conversion member is observed from the outside can be more or less limited to the projecting portion and its surroundings. Specifically, the area of the emission surface can be smaller than when no projecting portion is formed. This allows the luminance of the light source device to be increased.

The spot of laser light emitted by the laser element is preferably of a size that will fit on the above-mentioned projecting portion. More specifically, it is preferably no more than 1 mm$^2$, and more preferably no more than 0.5 mm$^2$. The size of the laser light spot is at least 0.007 mm$^2$, for example. Also, the size of the laser light spot is such that the width is at least 0.1 mm, for example. The term "width" here refers to the diameter in the case of an approximate circle, and to the major diameter (the length of the major axis) in the case of an approximate ellipse. The spot of laser light can be adjusted using a lens, a fiber, or another such optical member. The angle at which the laser light is incident on the wavelength conversion member can be suitably set according to the intended light extraction direction, the type of laser light, and so forth. For instance, a direction perpendicular to the top surface of the projecting portion is avoided so that the reflection direction and the incidence direction of the laser light will not coincide.

The laser element is used in a state of being housed in a package, for example. The laser element is preferably airtightly sealed by the package, which helps keep dust from collecting as a result of the laser light emitted by the laser element.

A plurality of laser elements may be provided. In this case, the laser elements are preferably arranged at positions where the laser light they emit is emitted by the same projecting portions of the wavelength conversion member. This allows high-density laser light to be emitted by a single projecting portion, and affords higher luminance.

The laser element emits laser light having a peak wavelength between 430 and 470 nm, for example. Laser light in this wavelength band is suited to the excitation of YAG phosphors. A GaN laser element is another example of a laser element that emits laser light in this wavelength band.

Other Members

The light emitting device may employ other members such as a light control member, a lens (converging lens, collimating lens, etc.), a dichroic mirror, a fiber, or the like, either singly or in combination, as described, for example, in Japanese Laid-Open Patent Applications 2013-250321, and 2012-243624. With the use of such members, the size and shape of the spot of the laser light can be adjusted. Also, a lens or the like may be used to converge the light after it has gone through the phosphor-containing layer.

The wavelength conversion member and light source device according to the first to the eighth embodiments 8 will now be described below with reference to the drawings. The embodiments given below are merely examples that embody the technological concept of the present invention, and the present invention is not limited to what follows. The sizes and the arrangement relationships of the members in each drawing are occasionally shown exaggerated for ease of explanation. Further, in the description below, the same designations or the same reference numerals denote the same or like members and duplicative descriptions will be appropriately omitted.

First Embodiment: Wavelength Conversion Member

As shown in FIGS. 1A and 1B, a wavelength conversion member 10 according to a first embodiment has a light-reflecting member 13 for reflecting laser light, and a phosphor-containing layer 12 provided on this light-reflecting member 13. The light-reflecting member 13 is provided above a substrate 11.

Starting from the substrate 11 side, the phosphor-containing layer 12 has a base component 12b and a projecting portion 12a that is continuous to the base component 12b. The projecting portion 12a is larger than the spot of laser light irradiating the projecting portion 12a.

The substrate 11 is configured so that a nickel layer and a gold layer are provided to the surface of a copper plate, in that order from the copper plate side. The substrate 11 is in the form of a square plate in its planar shape, measures about 10×20 mm, and is about 2 mm thick.

The phosphor-containing layer 12 is fixed to the middle part of the substrate 11 in a plan view. The base component 12b is square in its planar shape, measures about 3×3 mm, and is about 100 µm thick. Specifically, the distance from the lower surface of the phosphor-containing layer 12 to the lower end of grooves 12c is about 40 µm. The combined thickness of the base component 12b and the projecting portion 12a is about 100 µm.

Two straight grooves 12c (about 0.5 mm wide) are formed laterally, and two vertically, equally spaced apart, in the surface of the phosphor-containing layer 12, and these partition off the center part of the phosphor-containing layer 12, resulting in the projecting portion 12a with a square planar shape. Therefore, a plurality of projecting portions 12a' are arranged adjacent to the projecting portion 12a, via the grooves 12c, vertically, laterally, and obliquely. The depth of the grooves 12c is about 60 μm.

The top surface of the projecting portion 12a is smaller than 1 mm². More specifically, it is a square measuring about 0.7×0.7 mm.

The top surfaces of the projecting portions 12a and 12a' are flat.

The light-reflecting member 13 is provided under the phosphor-containing layer 12, and is fixed to the substrate 11 with a joining layer 14. The light-reflecting member 13 has a dielectric material multilayer film consisting of repeated laminations of an $SiO_2$ film and an $Nb_2O_5$ film, and a silver film in that order, starting from the phosphor-containing layer 12 side. The transmissivity of the light-reflecting member 13 with respect to laser light with a wavelength of 400 to 800 nm is about 95 to 99%.

This increases the strength of the phosphor-containing layer in the base component, allowing the substrate to support the strength of the phosphor-containing layer and ensuring a heat dissipation path. Also, the spreading out of laser light, etc., in the interior of the phosphor-containing layer can be suppressed by the projecting portions. As a result, heat dissipation and strength can be improved, and the luminance of the light source device can be increased when used along with a laser element.

Such a wavelength conversion member can be manufactured by the following method, for example.

First, a powder composed of a YAG-based phosphor ($[Y_{2.95}Ce_{0.05}]Al_5O_{12}$) and having an average particle size of approximately 10 μm is mixed with a support composed of aluminum oxide ($Al_2O_3$), and this mixture is sintered by SPS sintering to produce a phosphor block.

Next, the phosphor block is sliced with a wire saw into a section with a thickness of 0.3 mm. After this, both sides of the section are ground with #800 diamond grit, and polishing and CMP processing are performed to adjust the thickness of the phosphor member to 100 μm. This process gives a sheet of phosphor having a mirror surface.

After this, the phosphor member is cut into individual units measuring about 3×3 mm, and joined by the joining layer 14 to the upper surface of the substrate 11. The joining layer 14 mainly includes a eutectic AuSn alloy. After this, the grooves 12c are formed to produce the wavelength conversion member 10 has the phosphor-containing layer 12.

Second Embodiment: Wavelength Conversion Member

As shown in FIGS. 2A and 2B, a wavelength conversion member 20 in a second embodiment has a light-reflecting member 23 for reflecting laser light, and a phosphor-containing layer 22 provided on this light-reflecting member 23.

The configuration here is the same as that of the wavelength conversion member 10 in the first embodiment, except that the phosphor-containing layer 22 has one projecting portion 22a in the approximate center of a base component 22b, and continuous to the base component 22b.

The same effect is obtained with the second embodiment as with the wavelength conversion member 10 in the first embodiment. Also, since light exiting the side surfaces of the projecting portion 22a tends not to re-enter the phosphor-containing layer 22, emission in regions other than the projecting portion 22a can be reduced.

Third Embodiment: Wavelength Conversion Member

Figure 3:
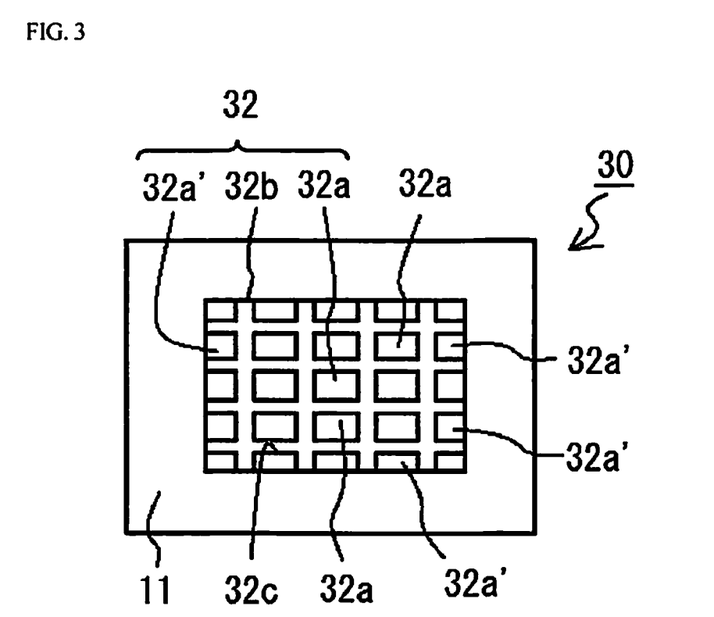
FIG. 3 is a plan view of a wavelength conversion member according to a third embodiments of the present invention.

As shown in FIG. 3, a wavelength conversion member 30 in a third embodiment has a light-reflecting member for reflecting laser light, and a phosphor-containing layer 32 provided on this light-reflecting member.

In a plan view, the size of the substrate 11 is about 20×40 mm, and the size of the phosphor-containing layer 32 is about 6×6 mm. In the phosphor-containing layer 32, projecting portions 32a are arranged in three rows and three columns, via grooves 32c with a width of 0.5 mm, integrally in the center of the phosphor-containing layer 32 on a base component 32b, and projecting portions 32a' are arranged adjacent to these via the grooves 32c around the outside. Otherwise, the configuration is the same as that of the wavelength conversion member 10 in the first embodiment 1.

The same effect is obtained with the third embodiment as with the wavelength conversion member 10 in the first embodiment.

Also, the projecting portions 32a are arranged so as to correspond to a situation in which a plurality of different locations is irradiated with laser light. The laser light may irradiate the projecting portions 32a one at a time in a specific sequence.

Fourth Embodiment: Wavelength Conversion Member

Figure 4:
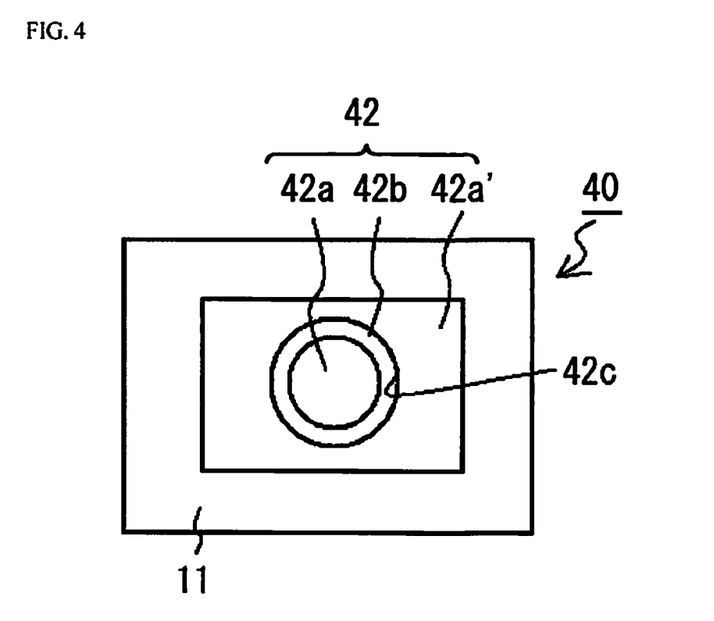
FIG. 4 is a plan view of a wavelength conversion members according to a forth embodiments of the present invention.

As shown in FIG. 4, a wavelength conversion member 40 in a fourth embodiment has a light-reflecting member for reflecting laser light, and a phosphor-containing layer 42 provided on this light-reflecting member.

The phosphor-containing layer 42 has one projecting portion 42a that has a circular planar shape and is continuous to a base component 42b, in the approximate center of the base component 42b. A groove 42c is formed around the outside of the projecting portion 42a, and a projecting portion 42d is disposed around the outside of the groove 42c. Otherwise, the configuration is the same as that of the wavelength conversion member 10 in the first embodiment.

The same effect is obtained with the fourth embodiment as with the wavelength conversion member 10 in the first embodiment. Also, since the planar shape of the projecting portion is circular, the similarity to the shape of the laser light spot is greater than with the wavelength conversion member 10 in the first embodiment 1. Consequently, the area of the portion not irradiated with laser light can be reduced, and luminance can be further increased.

Fifth Embodiment: Wavelength Conversion Member

As shown in FIG. 5, a wavelength conversion member 50 in a fifth embodiment has a phosphor-containing layer 52 that has a projecting portion 52a that is continuous to a base component 52b, in the approximate center of the base component 52b.

The cross sectional shape of the groove 52c that demarcates the projecting portion 52 is V shaped. Otherwise, the configuration is the same as that of the wavelength conversion member 10 in the first embodiment.

Sixth Embodiment: Wavelength Conversion Member

Figure 6:
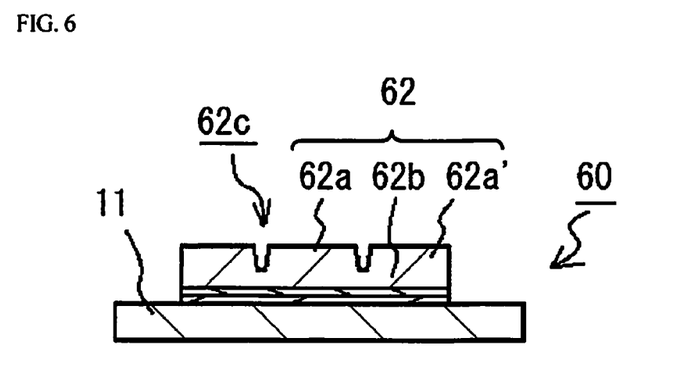
FIG. 6 is a cross sectional view of a wavelength conversion member according to a sixth embodiment of the present invention.

As shown in FIG. 6, a wavelength conversion member 60 in a sixth embodiment has a phosphor-containing layer 62 that has a projecting portion 62a that is continuous to a base component 62b, in the approximate center of the base component 62b.

The cross sectional shape of a groove 62c that demarcates a projecting portion 62a is a tapered shape that narrows on the bottom surface side. Otherwise, the configuration is the same as that of the wavelength conversion member 10 in the first embodiment.

Seventh Embodiment: Wavelength Conversion Member

Figure 7:
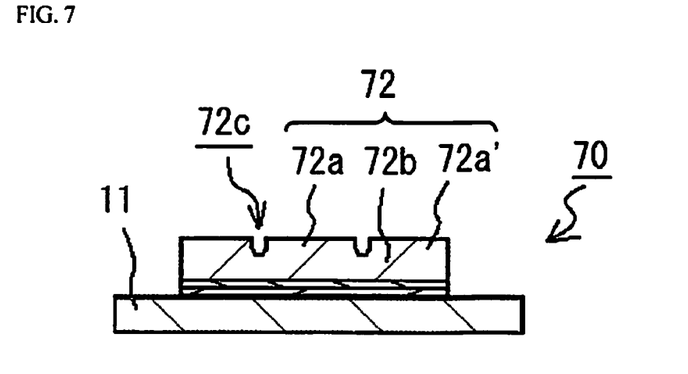
FIG. 7 is a cross sectional view of a wavelength conversion member according to a seventh embodiment of the present invention.

As shown in FIG. 7, a wavelength conversion member 70 in a seventh embodiment has a phosphor-containing layer 72 that has a projecting portion 72a that is continuous to a base component 72b, in the approximate center of the base component 72b.

The cross sectional shape of a groove 72c that demarcates a projecting portion 72a is semi-elliptical. Otherwise, the configuration is the same as that of the wavelength conversion member 10 in the first embodiment Eighth Embodiment: Light Emitting Device As shown in FIG. 8, a light emitting device 100 in an eighth embodiment has the wavelength conversion member 10 and one or more laser elements 80 for irradiating the phosphor-containing layer 12 with laser light. The wavelength conversion member 10 is arranged at the position where the laser light A emitted from the laser element 80 irradiates the projecting portion 12a of the wavelength conversion member 10.

The laser element 80 is able to emit laser light with a peak wavelength of approximately 450 nm, and the FFP of this laser light is approximately elliptical. As shown in FIG. 8, the laser light is incident obliquely to the top surface of the projecting portion 12a, so the shape of the laser light spot at the top surface of the projecting portion 12a is approximately elliptical. The size of the spot is such that the length in the lengthwise direction is 0.5 mm and the length in the other direction is 03 mm, for example.

With this configuration, a sufficient area of the phosphor-containing layer can be ensured at the base component, which improves the strength and heat dissipation of the phosphor-containing layer. Also, the base component of the phosphor-containing layer ensures a relatively large area of the heat dissipation path to the substrate and so on, making efficient heat dissipation possible. Furthermore, the spreading out of laser light, etc., in the interior of the phosphor-containing layer can be suppressed by the projecting portion. As a result, the luminance of the light source device can be increased.

The light source device of the present disclosure can be used in a variety of light sources, according to the applications, such as a projector, various light sources for vehicles including headlights, backlight light source of liquid crystal display, various lighting equipment and the like.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A wavelength conversion member adapted to be irradiated by laser light emitted from a laser element, the wavelength conversion member comprising:

a light-reflecting member configured to reflect the laser light; and a phosphor-containing layer disposed on the light-reflecting member, the phosphor-containing layer having one or more projecting portions, each of the one or more projection portions being configured to be irradiated with the laser light, an area of each of the one or more projecting portions being larger than an area of a spot of the laser light irradiated on the each of the one or more projecting portions in a plan view, wherein the one or more projecting portions is demarcated by grooves, and each of the grooves respectively has a depth that is 50 to 80% of a thickness of the phosphor-containing layer.

2. The wavelength conversion member according to claim 1, wherein each of the one or more projecting portions has a substantially flat top surface, and an area of the top surface is less than two times the area of the spot of the laser light.

3. The wavelength conversion member according to claim 1, wherein each of the one or more projecting portions has a substantially flat top surface, and an area of the top surface is 1 mm$^2$ or less.

4. The wavelength conversion member according to claim 1, wherein the grooves are formed in the phosphor-containing layer with the bottoms of the grooves being at least 20 μm apart from an upper plane of the light-reflecting member.

5. The wavelength conversion member according to claim 1, wherein a width of each of the grooves is greater than a wavelength of the laser light irradiated on the phosphor-containing layer.

6. The wavelength conversion member according to claim 1, further comprising a substrate disposed under the light-reflecting member.

7. The wavelength conversion member according to claim 6, wherein the substrate is made of a material having a thermal conductivity greater than a thermal conductivity of the phosphor-containing layer.

8. The wavelength conversion member according to claim 1, wherein the one or more projecting portions incudes a plurality of the projecting portions each being configured to be irradiated with the laser light.

9. A light source device comprising:

the wavelength conversion member according to claim 1; and one or more of the laser element;

wherein the wavelength conversion member is arranged at a position so that the laser light emitted from each of the one or more of the laser element is irradiated on a corresponding one of the one or more projecting portions.

10. The light source device according to claim 9, wherein the one or more of the laser element includes a plurality of laser elements arranged at positions so that laser lights emitted from the laser elements are irradiated on a single one of the one or more projecting portions of the wavelength conversion member.

11. A light source device comprising:

one or more laser elements each configured to emit laser light; and a wavelength conversion member having
  a light-reflecting member configured to reflect the laser light, and
  a phosphor-containing layer disposed on the light-reflecting member to be irradiated with the laser light, the phosphor-containing layer having one or more main projecting portions and one or more other projecting portions, an area of each of the one or more main projecting portions being larger than an area of a spot of the laser light,
the wavelength conversion member being arranged at a position so that the laser light is irradiated on each of the one or more main projecting portions and not irradiated on the one or more other projecting portions, wherein
the one or more main projecting portions is demarcated by grooves, and
each of the grooves respectively has a depth that is 50 to 80% of a thickness of the phosphor-containing layer.

12. The light source device according to claim 11, wherein each of the one or more main projecting portions has a substantially flat top surface, and an area of the top surface is less than two times the area of the spot of the laser light.

13. The light source device according to claim 11, wherein the grooves are formed in the phosphor-containing layer with the bottoms of the grooves being at least 20 μm apart from an upper plane of the light-reflecting member.

14. The light source device according to claim 11, wherein a width of each of the grooves is greater than a wavelength of the laser light irradiated on the phosphor-containing layer.

15. A wavelength conversion member adapted to be irradiated by laser light emitted from a laser element, the wavelength conversion member comprising:
  a light-reflecting member configured to reflect the laser light; and
  a phosphor-containing layer disposed on the light-reflecting member, the phosphor-containing layer having one or more projecting portions, each of the one or more projection portions being configured to be irradiated with the laser light, an area of each of the one or more projecting portions being larger than an area of a spot of the laser light irradiated on the each of the one or more projecting portions in a plan view, wherein
the one or more projecting portions is demarcated by grooves, and
the grooves are formed in the phosphor-containing layer with the bottoms of the grooves being at least 20 μm apart from an upper plane of the light-reflecting member.

16. A light source device comprising:
one or more laser elements each configured to emit laser light; and
a wavelength conversion member having
  a light-reflecting member configured to reflect the laser light, and
  a phosphor-containing layer disposed on the light-reflecting member to be irradiated with the laser light, the phosphor-containing layer having one or more main projecting portions and one or more other projecting portions, an area of each of the one or more main projecting portions being larger than an area of a spot of the laser light,
the wavelength conversion member being arranged at a position so that the laser light is irradiated on each of the one or more main projecting portions and not irradiated on the one or more other projecting portions, wherein
the one or more main projecting portions is demarcated by grooves, and
the grooves are formed in the phosphor-containing layer with the bottoms of the grooves being at least 20 μm apart from an upper plane of the light-reflecting member.

* * * * *